US006046871A

United States Patent [19]

Schaenzer et al.

[11] Patent Number: 6,046,871

[45] Date of Patent: Apr. 4, 2000

[54] MAGNETIC RECORDING HEAD SLIDER WITH PIEZOELECTRIC SENSOR FOR MEASURING SLIDER TO DISC INTERFERENCE LEVELS

[75] Inventors: Mark J. Schaenzer, Eagan; He Huang, Eden Prairie, both of Minn.

[73] Assignee: Seagate Technology, Inc., Scotts Valley, Calif.

[21] Appl. No.: 08/969,038

[22] Filed: Nov. 12, 1997

Related U.S. Application Data

[63] Continuation-in-part of application No. 08/839,992, Apr. 24, 1997, Pat. No. 5,872,311.

[60] Provisional application No. 60/042,169, Mar. 31, 1997.

[51] Int. Cl.[7] .............................. G11B 27/36; G11B 5/09; G11B 5/187

[52] U.S. Cl. ................................ 360/31; 360/53; 360/122

[58] Field of Search ................................ 360/31, 53, 122, 360/128; 73/105

[56] References Cited

U.S. PATENT DOCUMENTS

| | | | |
|---|---|---|---|
| 4,532,802 | 8/1985 | Yeack-Scranton et al. | 73/432 R |
| 5,325,244 | 6/1994 | Takano et al. | 360/77.03 |
| 5,831,781 | 11/1998 | Okamura | 360/31 |
| 5,872,311 | 2/1999 | Schaenzer et al. | 73/105 |

FOREIGN PATENT DOCUMENTS 407085410A 3/1995 Japan .

*Primary Examiner*—W. Chris Kim
*Attorney, Agent, or Firm*—Kinney & Lange, P.A.

[57] ABSTRACT

A magnetic recording head for use in a disc drive system including a rotating disc has a slider body and a transducer on the slider body for reading and/or writing data from and/or to the disc. A piezoelectric sensor is provided on the slider body and produces a signal representing a level of interference between the slider body and the rotating disc. A method of predicting a head crash includes establishing a nominal level of interference between the magnetic recording head and the rotating disc and establishing a threshold interference level difference. The level of interference between the magnetic recording head and the rotating disc represented by the signal provided by the piezoelectric sensor is monitored during operation of the disc drive system. A predicted head crash is indicated when the level of interference between the magnetic recording head and the rotating disc is different from the nominal level of interference by more than the threshold.

7 Claims, 6 Drawing Sheets

MAGNETIC RECORDING HEAD SLIDER WITH PIEZOELECTRIC SENSOR FOR MEASURING SLIDER TO DISC INTERFERENCE LEVELS

CROSS-REFERENCE TO RELATED APPLICATION

This application is a continuation-in-part of U.S. application Ser. No. 08/839,992 (issued Feb. 16, 1999 as U.S. Pat. No. 5,872,311) filed Apr. 24, 1997 for "Integrated Piezoelectric and Thermal Asperity Transducers For Testing Disc Media in High Performance Disc Drives" by M. Schaenzer, B. Keel, Z. Boutaghou and S. Nagarajan.

This application claims priority from Provisional Application No. 60/042,169, filed Mar. 31, 1997 for "Magnetic Recording Head with PZT Sensor for Measuring Head to Disc Interference Levels" by Mark J. Schaenzer and He Huang.

BACKGROUND OF THE INVENTION

The present invention relates to a disc drive slider, and more particularly to a magnetic recording head slider having a piezoelectric sensor formed therein at the wafer processing level to measure interference levels between the slider and the disc as the slider flies over the disc.

The data density of a high performance magnetic disc drive is highly dependent on the separation distance between the recording head and the recording surface. To meet the ever-increasing need to pack as much data onto the surface of a magnetic disc as possible, the separation distance between the recording head and the disc in commercial high performance disc drives has continued to shrink. Some high performance magnetic recording systems have sliders carrying transducing heads which are separated from the magnetic disc by less than two millionths of an inch. Other systems maintain the recording head in virtual contact with the disc surface, referred to as virtual contact recording (VCR) for proximity recording. The performance tolerances of these systems is currently being controlled by tight supervision of the manufacturing tolerances of the components of the disc drive. However, even with careful control of the manufacturing processes, component or system failures may still occur where the systems degrade over time or where components, such as heads and discs, interfere with each other to cause premature failure.

In the case of flying magnetic recording heads with small glide heights, component or system failures are typically a result of the head crashing onto the surface of the disc. The head crash is often preceded by an increased level of physical interference between the head and the disc. Interference is the turbulence, striking of particulate, or other physical phenomena occurring between the head and the disc surface that affect glide height The interference problem may be caused by environmental factors, component wear, or a combination of both. Environmental conditions such as altitude, temperature, humidity and others affect the flying height of the head. They also affect the tribochemical response of the disc and head surfaces. Component wear due to vibration or contamination can lead to an increased level of particulate at the head/disc interface, which can interfere with the head to disc spacing and ultimately lead to a head crash.

In the case of VCR heads, the heads fly in light interference with the disc surface. Over the course of time as the drive is operated, the interference level may reduce as a result of burnishing of the head and the disc surface, or the interference level may increase due to wear or other factors causing roughness in the interface between the head and the disc surface. Either of these situations affect the performance of the recording head.

One significant problem related to disc drive failures due to interference between the head and the disc is that they are typically difficult to predict. Some disc drives employ systems designed to predict failure, relying on information such as motor torque to anticipate a prospective failure. However, more reliable and direct systems for predicting disc drive failure based on changing interference levels would be an improvement in the art.

BRIEF SUMMARY OF THE INVENTION

The present invention is a magnetic recording head for use in a disc drive system including a rotating disc. The magnetic recording head includes a slider body and at least one transducer on the slider body for reading and/or writing data from and/or to the disc. A piezoelectric sensor on the slider body produces a signal representing a level of interference between the slider body and the rotating disc.

Another aspect of the present invention is a method of predicting a crash between a magnetic recording head and a rotating disc of a disc drive system. A piezoelectric sensor is provided on the magnetic recording head and produces a signal representing a level of interference between the magnetic recording head and the rotating disc. A nominal level of interference between the magnetic recording head and the rotating disc is established, and a threshold interference level difference is established. The level of interference between the magnetic recording head and the rotating disc represented by the signal provided by the piezoelectric sensor is monitored during operation of the disc drive system. A predicted head crash is indicated when the level of interference between the magnetic recording head and the rotating disc is different from the nominal level of interference by more than the threshold.

In one embodiment, a second threshold interference level variance is established, and a predetermined time period is established. A variance among interference level signals during the predetermined time period is determined, and a predicted head crash is indicated when the variance among interference level signals during the predetermined period exceeds the second threshold interference level variance.

DETAILED DESCRIPTION OF THE PREFERRED EMBODIMENTS

Figure 1:
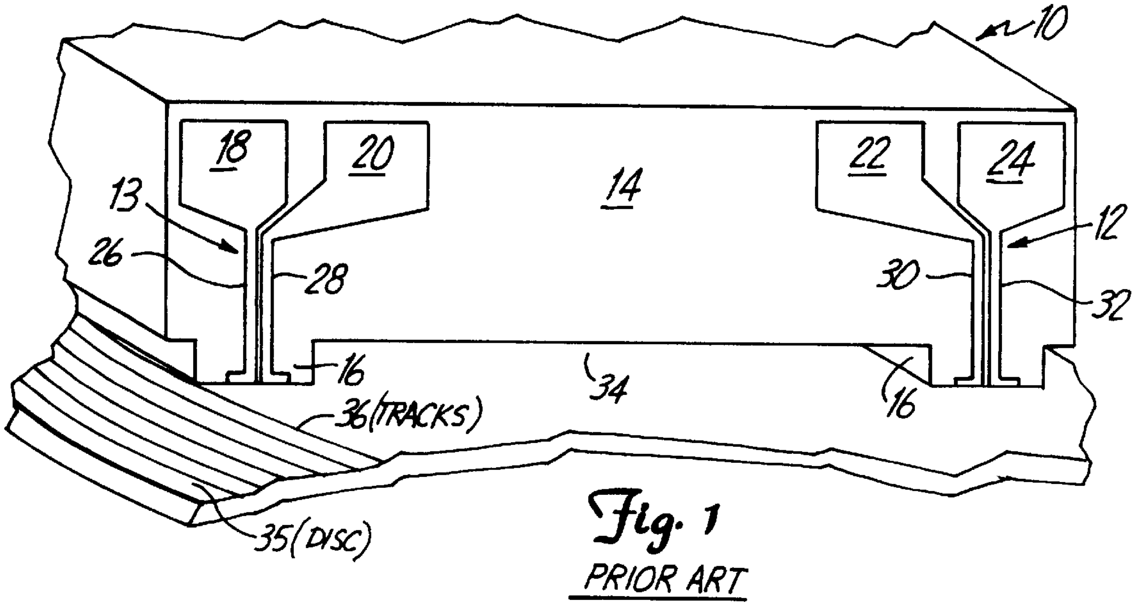
FIG. 1 is a perspective view of a disc drive slider having dual rails and a magnetoresistive sensor on each rail, showing the rear of the slider as it flies over a rotating disc.

FIG. 1 is a perspective view of a flying disc drive slider 10 showing the rear of slider 10 incorporating a magnetoresistive (MR) head positioned above disc 35, which is a magnetic storage medium. Slider 10 includes transducers 12 and 13, rear surface 14, rails 16, pads 18, 20, 22 and 24, contacts 26, 28, 30 and 32, and recessed area 34. Rails 16 extend from rear surface 14 of slider 10 to the front surface of slider 10 (not shown in FIG. 1) in a manner well known in the art. Rails 16 form recessed area or cavity 34 between them to define the flying characteristics of the slider. Pads 18, 20, 22 and 24 provide electrical connection to circuitry exterior to slider 10. Disc 35 includes a plurality of concentric data tracks 36 recorded on its surface.

Contacts 26, 28, 30 and 32 provide electrical connection between pads 18, 20, 22 and 24, respectively, and a pair of MR sensors (part of transducers 12 and 13) at the bottom surface of rails 16 on rear surface 14. Contacts 26, 28, 30 and 32, also known as electrical leads or electrical contacts, are formed from a high conductivity metal to ensure a proper electrical connection. Contacts 26 and 28, as well as contacts 30 and 32, are routed as close together as possible, consistent with sense current carrying capabilities and photolithography constraints. The MR sensors are operable as is known in the art to detect data encoded on tracks 36 on the surface of disc 35. Transducers 12 and 13 each may also include an inductive write head to encode data on tracks 36 of disc 35, as is known in the art.

Figure 2:
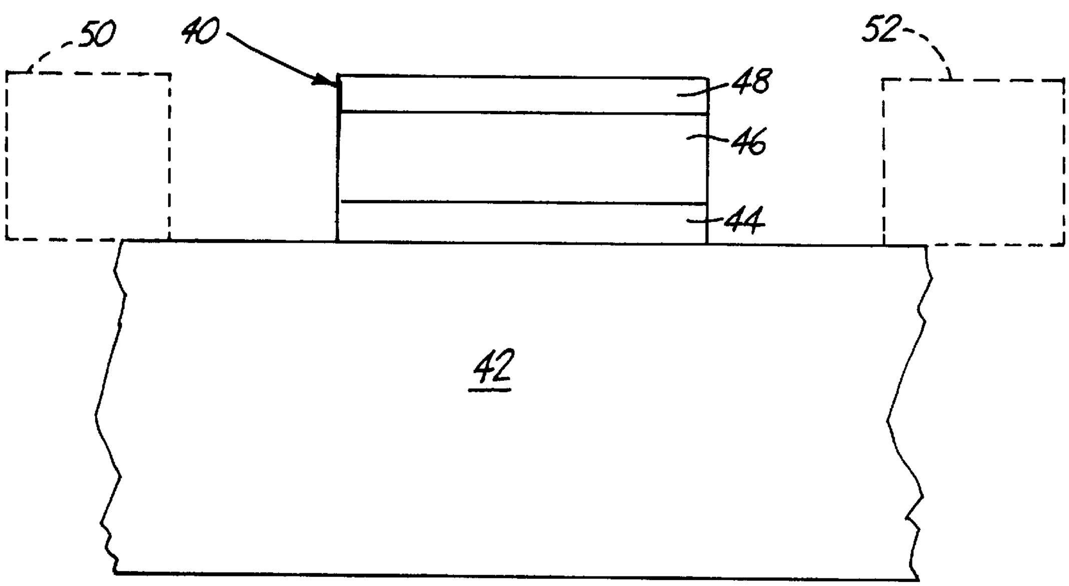
FIG. 2 is a layer diagram of a piezoelectric sensor according to the present invention.

FIG. 2 is a layer diagram of a piezoelectric sensor 40 according to the present invention. Substrate 42 is provided, and bottom conductor 44 is deposited on the base coat of substrate 42. Bottom conductor 44 may be composed of platinum (Pt), for example, and may be deposited by any of a number of methods known in the art. Piezoelectric element 46 is formed on bottom conductor 44. Piezoelectric element 46 may be deposited by sputtering or evaporating piezoelectric material on the wafer, by performing a wet process where the piezoelectric material is fabricated using a sol gel process, or by a screen printing process, all of which are known in the art. Top conductor 48 is then formed on piezoelectric element 46. Top conductor 48 may be composed of titanium (Ti), for example, and may be deposited by any of a number of methods known in the art.

The elements of piezoelectric sensor 40 are preferably formed in the same plane on the same substrate as magnetoresistive (MR) sensors 50 and 52, shown in phantom in FIG. 2. Therefore, only the steps of depositing bottom conductor 44, forming piezoelectric element 46 and depositing top conductor 48 are added to conventional wafer level fabrication processes in forming the disc drive head.

Figure 3:
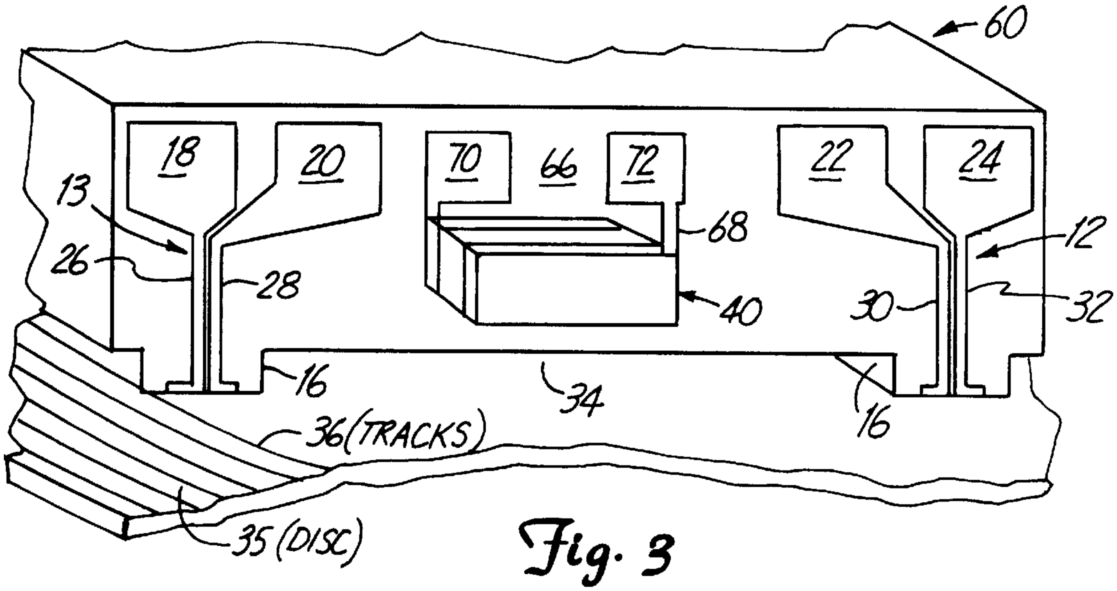
FIG. 3 is a perspective view of a disc drive slider having dual rails and dual magnetoresistive sensors, with a piezoelectric sensor in the slider according to a first embodiment of the present invention.

FIG. 3 is a perspective view of a flying disc drive slider 60 showing the rear of slider 60 as it flies over rotating disc 35. Slider 60 has dual rails 16 and dual MR sensors at the rails. Rails 16 form recessed area or cavity 34 between them to define the flying characteristics of the slider. The MR sensors are configured in a manner similar to the conventional MR sensors shown in FIG. 1. Slider 60 may also include an inductive write head to encode data on tracks 36 of disc 35, as is known in the art.

Slider 60 further includes piezoelectric sensor 40 between the MR sensors adjacent recessed area 34. Pads 70 and 72 are disposed on the rear surface of slider 60 to provide electrical connection to circuitry exterior to slider 60 (not shown). Contacts 66 and 68 provide electrical connection between pads 70 and 72, respectively, and piezoelectric sensor 40. Contacts 66 and 68 are preferably formed from a high conductivity metal to ensure a proper electrical connection. The voltage across the piezoelectric element of piezoelectric sensor 40 is thereby represented by the voltage difference between pads 70 and 72.

Figure 4:
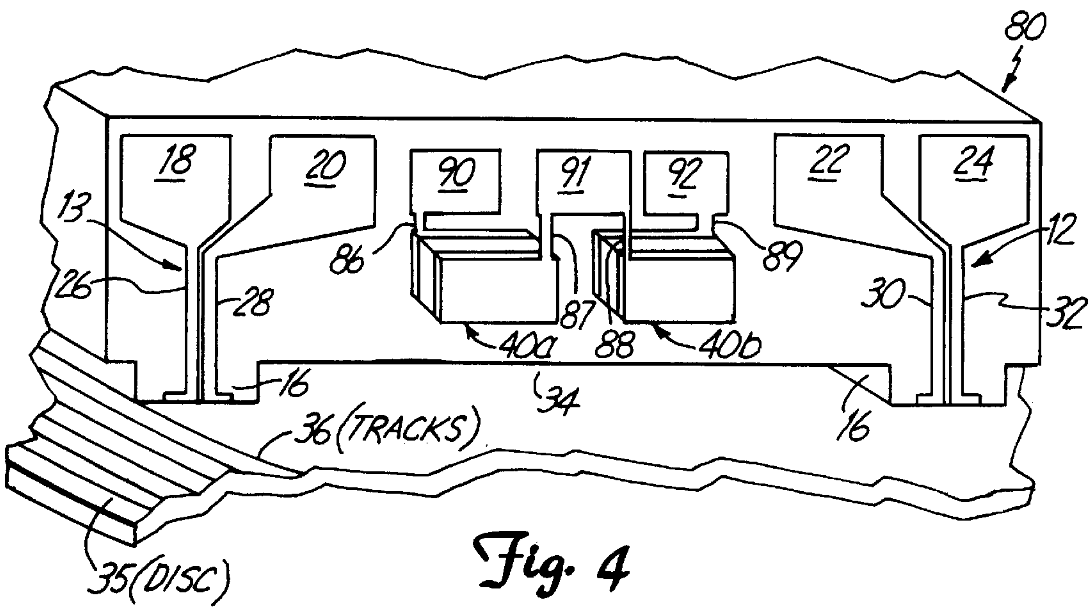
FIG. 4 is a perspective view of a disc drive slider having dual rails and dual magnetoresistive sensors, with two piezoelectric sensors in the slider according to a second embodiment of the present invention.

FIG. 4 is a perspective view of a flying disc drive slider 80 showing the rear of slider 80 as it flies over rotating disc 35. Slider 80 has dual rails 16 and dual MR sensors at the rails. Rails 16 form recessed area or cavity 34 between them to define the flying characteristics of the slider. The MR sensors are configured in a manner similar to the conventional MR sensors shown in FIG. 1. Slider 80 may also include an inductive write head to encode data on tracks 36 of disc 35, as is known in the art.

Slider 80 further includes two piezoelectric sensors **40*a* and 40*b* between the MR sensors adjacent recessed area 34. Pads 90, 91 and 92 are disposed on the rear surface of slider 80 to provide electrical connection to circuitry exterior to slider 80 (not shown). Contacts 86, 87, 88 and 89 provide electrical connection between pads 90, 91 and 92 and piezoelectric sensors 40*a* and 40*b*. Contacts 86, 87, 88 and 89 are preferably formed from a high conductivity metal to ensure a proper electrical connection. The voltages across the piezoelectric elements of piezoelectric sensors 40*a* and 40*b* are thereby represented by the voltage differences between pads 90 and 91 and pads 91 and 92**, respectively.

Figure 5:
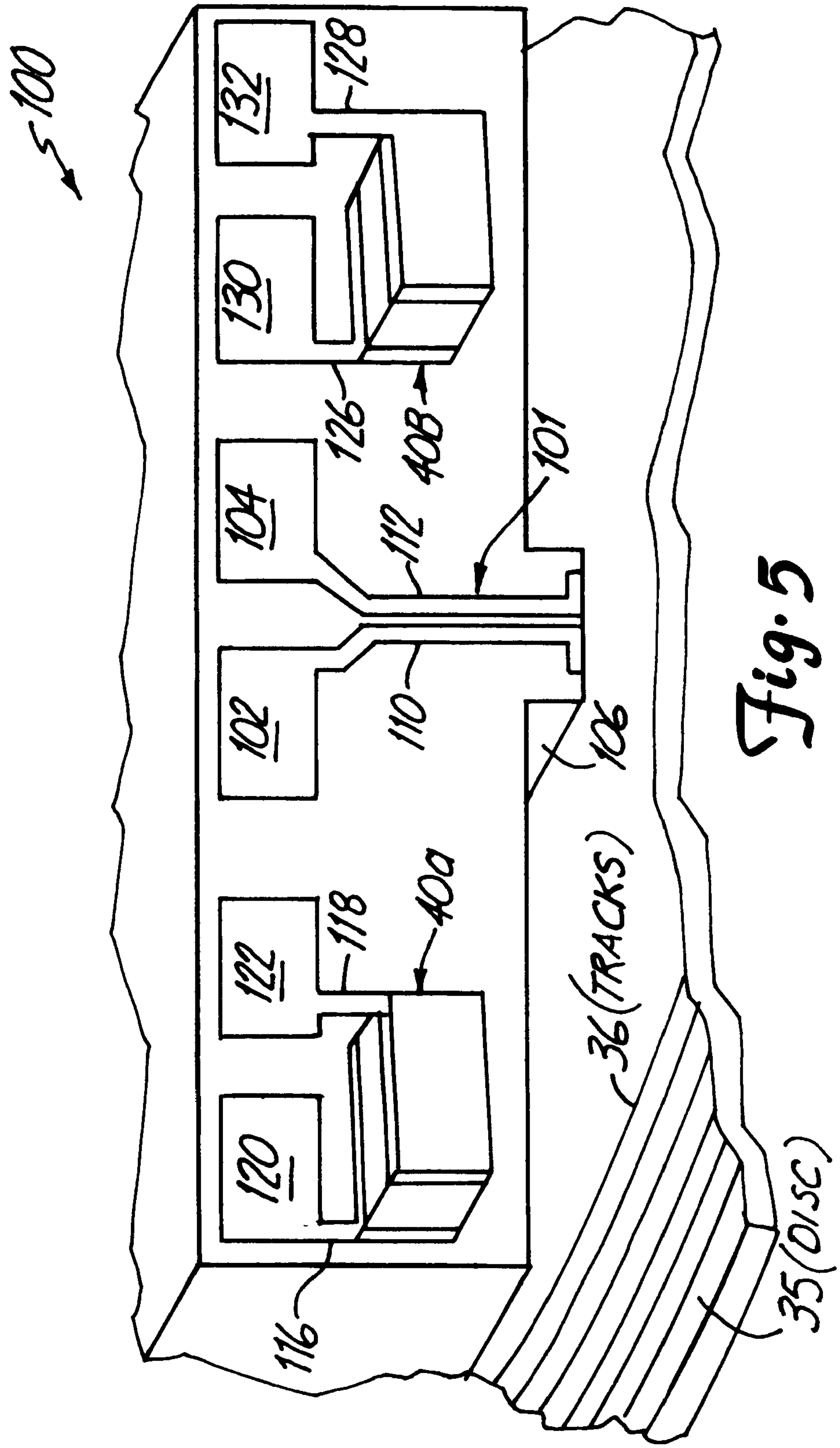
FIG. 5 is a perspective view of a disc drive slider having a single center rail and a single magnetoresistive sensor, with two spaced piezoelectric sensors in the slider according to a third embodiment of the present invention.

FIG. 5 is a perspective view of a virtual contact recording (VCR) disc drive slider 100 showing the rear of slider 100 as disc 35 rotates beneath it. Slider 100 has a single rail 106 and a single MR sensor 101 at the rail. MR sensor 101 is configured in a manner similar to the conventional MR sensors shown in FIG. 1, with pads 102 and 104 providing electrical connection to exterior circuitry and contacts 110 and 112 providing electrical connection between pads 102 and 104, respectively, and the MR element at the bottom surface of rail 106.

Slider 100 further includes piezoelectric sensors **40*a* and 40*b* flanking MR sensor 101. Pads 120, 122, 130 and 132 are disposed on the rear surface of slider 100 to provide electrical connection to circuitry exterior to slider 100 (not shown). Contacts 116, 118, 126 and 128 provide electrical connection between pads 120, 122, 130 and 132, respectively, and piezoelectric sensors 40*a* and 40*b*. Contacts 116, 118, 126 and 128 are preferably formed from a high conductivity metal to insure a proper electrical connection. The voltage across the piezoelectric element of piezoelectric sensor 40*a* is thereby represented by the voltage difference between pads 120 and 122. Similarly, the voltage across the piezoelectric element of piezoelectric sensor 40*b* is represented by the voltage difference between pads 130 and 132**.

All of the piezoelectric sensors shown in FIGS. 3–5 operate in a substantially similar manner. Vibrations of the slider caused by contact between the slider and disc 35 induce a voltage across the piezoelectric elements. By measuring the voltages across the piezoelectric elements, the magnitude and frequency of slider vibrations may be determined, from which the interference level between the head and the disc may be deduced. Changing interference levels are then used as a parameter to predict head crash and disc failures.

It should be understood that the orientations of piezoelectric sensors shown in FIGS. 3–5 are exemplary, and other orientations may also be employed. Preferably, orientations of the piezoelectric sensors are chosen so that the process of fabricating both the piezoelectric sensors and the transducers on the head is simplified to the greatest extent possible.

The embodiments shown in FIGS. 4 and 5 include dual piezoelectric sensors. The dual piezoelectric sensors may be operated individually, thereby providing sensor redundancy to protect against failure of one of the sensors. Alternatively, the sensors may be used in a differential mode or a ratio mode, which is helpful to reject common mode noise experienced by both sensors. When both sensors are operated simultaneously, the location of head to disc interference may be determined by examining the relative response of the two sensors.

Figure 6:
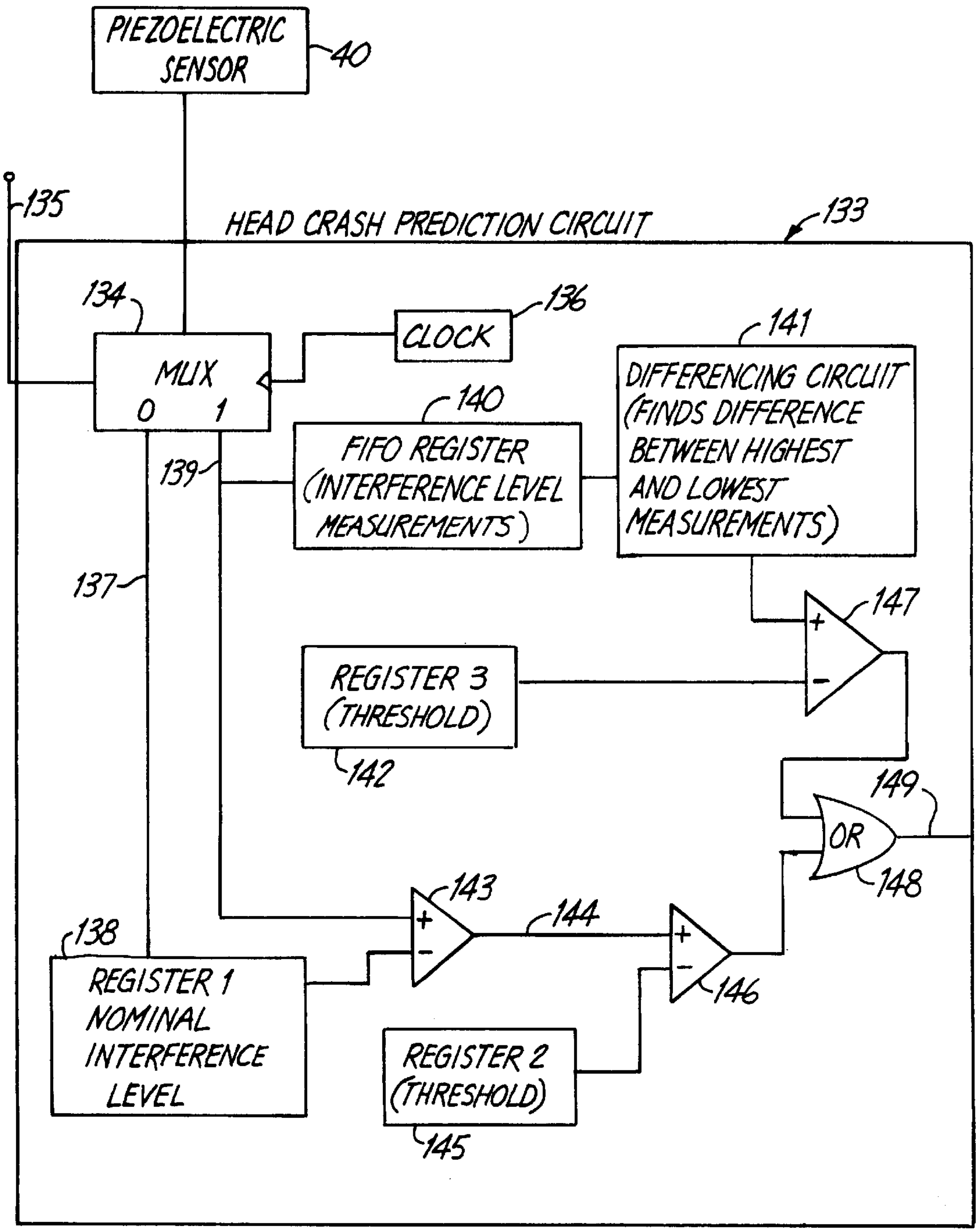
FIG. 6 is a block diagram of an exemplary circuit for predicted head crash based on signals from the piezoelectric sensor according to the present invention.

FIG. 6 is a block diagram of an exemplary head crash prediction circuit 133 for use with piezoelectric sensor 40 of the present invention. The voltage across piezoelectric sensor is input to head crash prediction circuit 133, and specifically is input to single-input multiplexer 134. Multiplexer 134 is controlled by control signal 135 and a clock signal from clock 136 to output the signal received on its input to its "0" output (line 137) or to its "1" output (line 139). Control signal 135 is a binary signal indicating the selected output, with the "0" output being selected for the initial measurement of the disc drive's nominal head to disc interference level and the "1" output being selected to compare an operating interference level to the nominal interference level. The initial measurement of nominal interference level is stored in register 138.

In operation, when multiplexer 134 outputs the signal from piezoelectric sensor 40 on its "1" output on line 139, the output signal is stored in first-in-first-out (FIFO) register 140. FIFO register 140 is a limited capacity register, so that only a predetermined number of interference measurements may be stored in FIFO register 140 at a time. When FIFO register 140 is full, additional interference measurements are stored (triggered by a clock signal from clock 136), but the oldest measurement stored in FIFO register 140 is deleted, so that the total number of measurements stored in the register remains the same. Differencing circuit 141 analyzes the interference measurement stored in FIFO register 140 and finds the difference between the greatest and the smallest measurement stored in the register. This difference represents the greatest change in interference level over a time period defined by the time required to take the number of measurements to fill FIFO register 140. The size of register 140 and frequency of measurements (that is, the frequency of clock 136) are controlled so that this time period is a selected, predetermined time period over which the variance of interference measurements is to be analyzed. Register 142 stores a threshold, which is the maximum allowable variance of interference measurements within the predetermined time period. Comparator 147 compares the actual variance and the threshold variance of interference measurements, and outputs a signal indicating whether the actual variance is greater than or less than the threshold.

The signal from piezoelectric sensor 40 from the "1" output of multiplexer 134 on line 139 is also compared by comparator 143 to the nominal interference level stored in register 138. The output of comparator 143 on line 144 represents the difference between the current measured interference level and the nominal interference level. Register 145 stores a threshold, which is the maximum allowable difference between the current interference level and the nominal interference level. Comparator 146 compares the signal on line 144 to the threshold signal stored in register 145, and outputs a signal indicating whether the actual difference between the current and nominal interference levels is greater than or less than the threshold.

If either of the outputs of comparators 147 and 146 indicate that the thresholds have been exceeded, then the user should be notified that imminent head crash is predicted. Therefore, OR gate 148 is provided with the outputs of comparators 147 and 146 as its inputs. OR gate 148 produces a signal on line 149 representing whether either of the outputs of comparators 147 and 146 indicates that a threshold has been exceeded, in which case head crash and subsequent drive failure is predicted.

It should be understood that the head crash prediction circuit in FIG. 6 is one simplistic example of such a circuit, and that many alterative designs may be used to achieve the same result of providing an output signal (e.g., line 149) indicating whether the measured head to disc interference level exceeds a nominal interference level by an amount greater than a threshold or whether the variance in the measured interference level exceeds a threshold variance within a predetermined time period.

Figure 7:
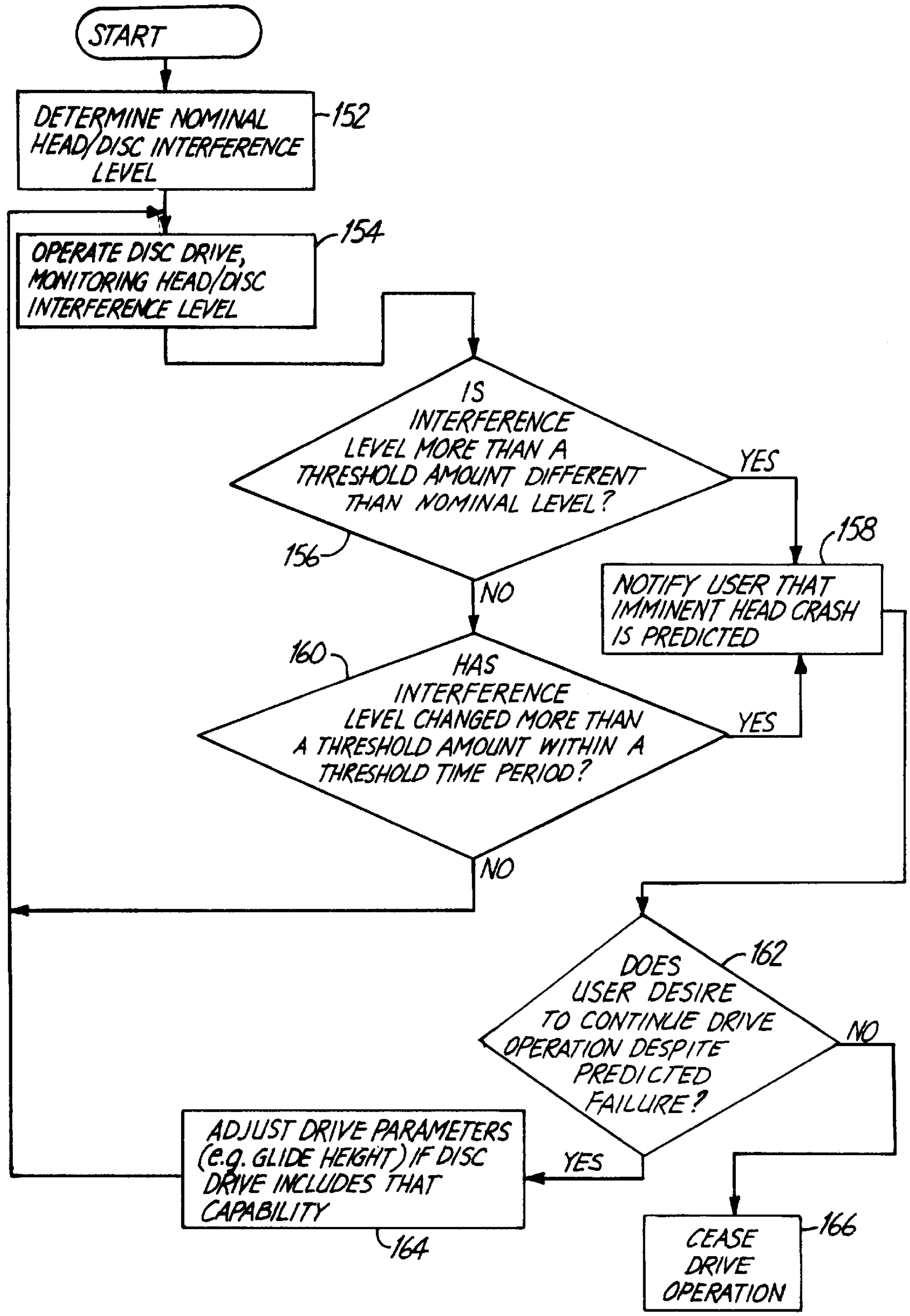
FIG. 7 is a flow diagram illustrating the steps of operating the piezoelectric sensor to predict head crash according to the present invention.

FIG. 7 is a flow diagram illustrating the steps of disc drive operation utilizing the piezoelectric sensor of the present invention to predict head crash and drive failure. Initially, the nominal head to disc interference level is determined for the particular disc drive being used, at block 152. This may be accomplished during manufacturing of the drive, upon installation of the drive, or at any time during the life of the drive by the end user or a service technician, for example. A typical flying magnetic recording head will have a very low (ideally zero) nominal head to disc interference level during normal operation, while a virtual contact recording (VCR) head will have a fixed, non-zero nominal interference level.

After the nominal head to disc interference level has been determined, the drive is operated normally while monitoring the head to disc interference level with the piezoelectric sensor(s) in the head, indicated by block 154. As the drive is operated, a determination is made whether the detected interference level between the head and the disc is more than a threshold amount different than the nominal interference level, at block 156. If the difference is greater than the threshold, the user is notified at block 158 that imminent head crash is predicted. If the difference is less than the threshold, a further determination is made whether the detected interference level has changed more than a threshold amount within a threshold time period, at block 160. If the level change within the threshold time period is greater than the threshold amount, the user is notified at block 158 that imminent head crash is predicted. If the level change within the threshold time period is less than the threshold amount, operation of the drive continues normally at block 154.

Once the user has been notified that imminent head crash is predicted at block 158, the user may have the option at block 162 to cease drive operation (block 166) or continue operation of the drive despite the predicted failure. If the user chooses to continue operation of the drive, drive parameters such as glide height or RPM, for example, may be adjusted at block 164 if the drive includes such structural capability, and the drive continues to operate at block 154. Alternatively, operation of the drive may be automatically halted upon prediction of a failure.

Figure 8:
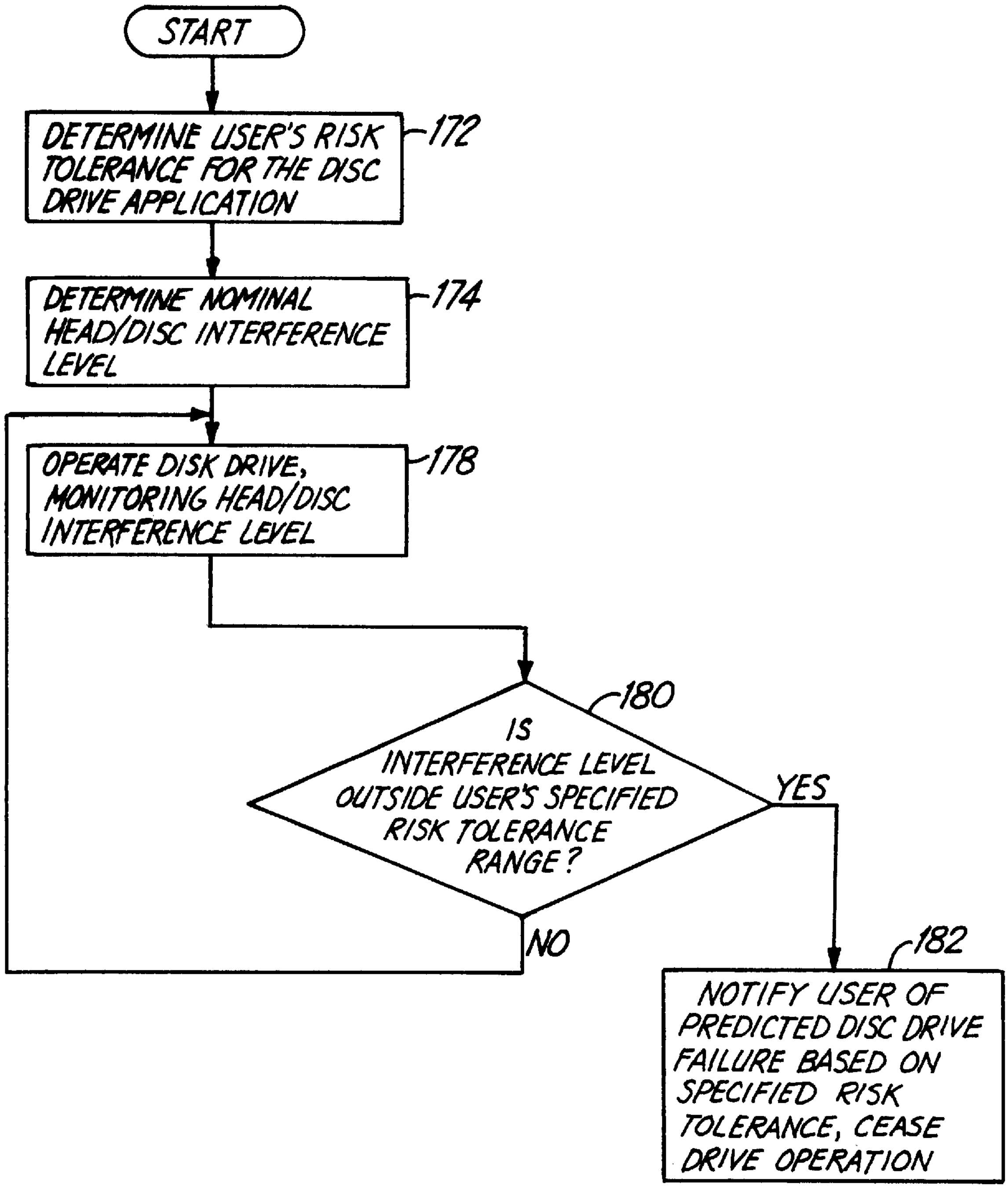
FIG. 8 is a flow diagram illustrating the steps of an alternate scheme of operation of the piezoelectric sensor to predict head crash according to the present invention.

FIG. 8 is a flow diagram illustrating the steps of an alternate scheme of operation utilizing the piezoelectric sensor of the present invention to predict head crash and drive failure according to a user's risk tolerance level. Initially, the risk tolerance level of the user for the relevant disc drive application is determined at block 172. This risk tolerance level may be determined during manufacture for drives that are constructed for specific applications, upon installation of the drive, or during the life of the drive by the end user or by a service technician, for example. The risk tolerance level is used to establish criteria and thresholds for predicting a head crash based on measured and nominal head to disc interference levels. Also during this initial stage, the nominal head to disc interference level is determined at block 174. This may be accomplished during manufacturing of the drive, upon installation of the drive, or at any time during the life of the drive by the end user or a service technician, for example. A typical flying magnetic recording head will have a very low (preferably zero) nominal head to disc interference level during normal operation, while a virtual contact recording (VCR) head will have a fixed, non-zero nominal interference level.

After the user's risk tolerance level and the nominal head to disc interference level has been determined, the drive is operated normally while monitoring the head to disc interference level with the piezoelectric sensor(s) in the head, indicated by block 178. As the drive is operated, a determination is made whether the detected interference level is outside the user's specified risk tolerance range, at block 180. This determination may be achieved by comparing measured interference levels with the nominal interference level, examining the variance between measured interference levels within a predetermined time period, or by other analytical means. Thresholds and criteria for the analysis is provided on the basis of the user's specified risk tolerance level, by accessing a lookup table, for example. If the level is within the risk tolerance range, operation of the drive continues normally at block 178. If the level is outside the risk tolerance range, the user is notified at block 182 that imminent head crash is predicted, and the drive is shut down. In this way, a user may dictate the conditions under which continued operation of the drive is acceptable, to accommodate both robust and highly sensitive applications.

The operational schemes illustrated in FIGS. 6 and 7 are exemplary, and it will be apparent to one skilled in the art that there are many potential applications of the piezoelectric sensor implemented in the recording head to predict head crashes and disc drive failures. The present invention provides one or more piezoelectric sensors in the recording head to furnish head to disc interference level information that is useful and may be manipulated to more reliably predict potential drive failure.

Although the present invention has been described with reference to preferred embodiments, workers skilled in the art will recognize that changes may be made in form and detail without departing from the spirit and scope of the invention.

What is claimed is:

1. A magnetic recording head for use in a disc drive system including a rotating disc, the magnetic recording head including a slider body having an outer surface and comprising:

at least one transducer in the slider body for reading and/or writing data from and/or to the disc;

a plurality of first contact pads on the outer surface of the slider body to electrically contact the at least one transducer;

means in the slider body for sensing a level of interference between the slider body and the rotating disc; and a plurality of second contact pads on the outer surface of the slider body to electrically contact the means for sensing a level of interference between the slider body and the rotating disc.

2. A magnetic recording head for use in a disc drive system including a rotating disc, the magnetic recording head comprising:

a slider body having an outer surface;

at least one transducer in the slider body for reading and/or writing data from and/or to the disc;

a plurality of first contact pads on the outer surface of the slider body electrically contacting the at least one transducer;

at least one piezoelectric sensor in the slider body, the piezoelectric sensor producing a signal representing a level of interference between the slider body and the rotating disc; and a plurality of second contact pads on the outer surface of the slider body electrically contacting the at least one piezoelectric sensor.

3. The magnetic recording head of claim 2, wherein the piezoelectric sensor comprises:

a bottom conductor;

a piezoelectric element on the bottom conductor; and a top conductor; and wherein the plurality of second contact pads electrically contacts the top conductor and the bottom conductor, and wherein the signal produced by the piezoelectric sensor is a voltage difference between the top and bottom conductors.

4. A method of predicting a crash between a magnetic recording head and a rotating disc of a disc drive system, the method comprising:

providing at least one piezoelectric sensor on the magnetic recording head, the piezoelectric sensor producing a signal representing a level of interference between the magnetic recording head and the rotating disc;

establishing a nominal level of interference between the magnetic recording head and the rotating disc;

establishing a threshold interference level;

monitoring the level of interference between the magnetic recording head and the rotating disc represented by the signal provided by the piezoelectric sensor during operation of the disc drive system; and indicating a predicted head crash when the level of interference between the magnetic recording head and the rotating disc is different from the nominal level of interference by more than the threshold.

5. The method of claim 4, wherein the threshold is determined according to a risk tolerance level for a particular disc drive application.

6. The method of claim 4, further comprising:

establishing a second threshold interference level;

establishing a predetermined time period;

determining a variance among interference level signals during the predetermined time period; and indicating a predicted head crash when the variance among interference level signals during the predetermined period exceeds the second threshold.

7. The method of claim 6, wherein the second threshold is determined according to a risk tolerance level for a particular disc drive application.

* * * * *